March 2, 1926.  1,575,213
J. F. KOHLER
MACHINE FOR ROLLING PIE CRUST DOUGH
Original Filed May 10, 1921   3 Sheets-Sheet 1
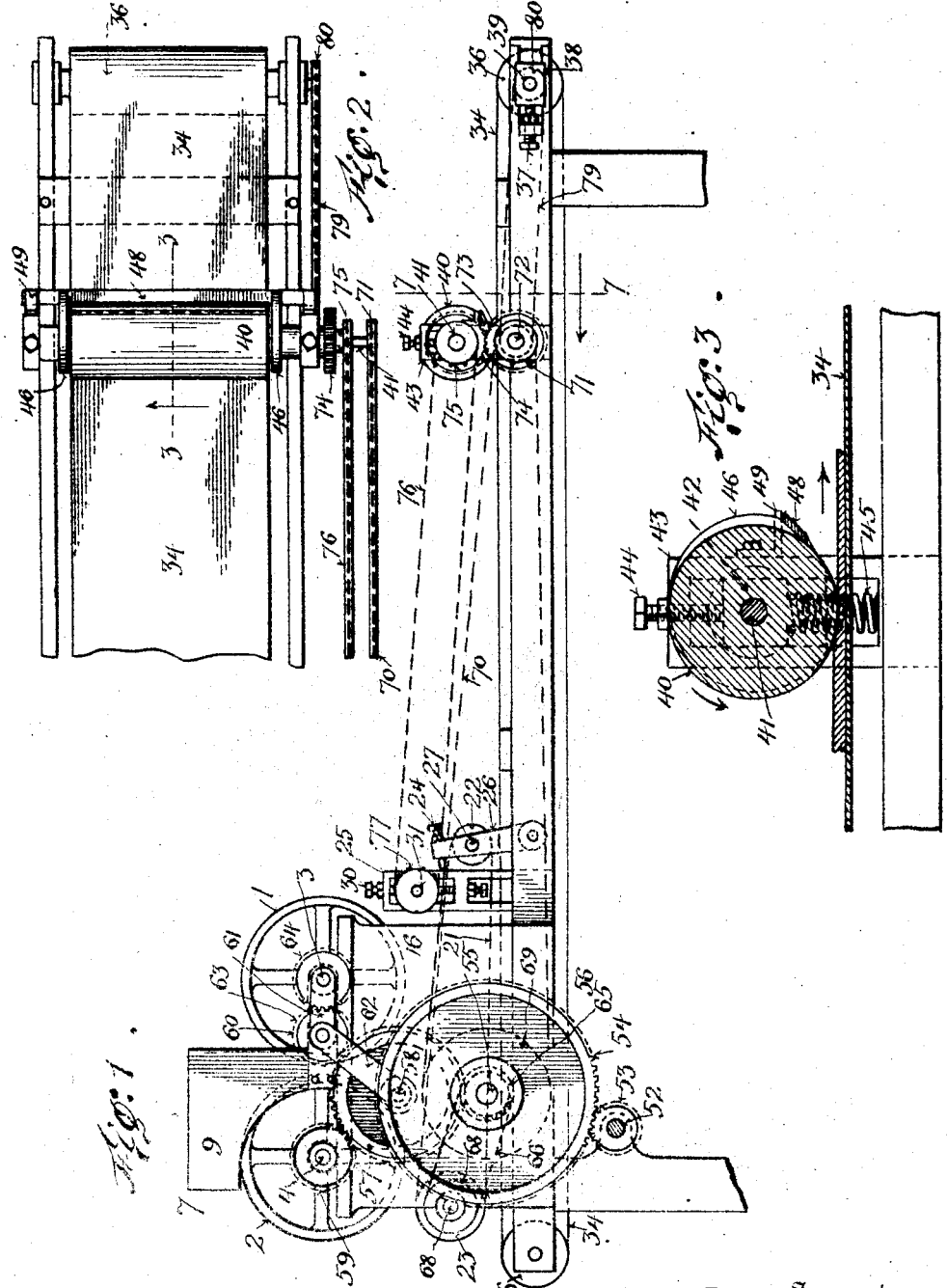
John F. Kohler, Inventor
By his Attorney
Charles H. Hensley March 2, 1926. 1,575,213
J. F. KOHLER
MACHINE FOR ROLLING PIE CRUST DOUGH
Original Filed May 10, 1921 3 Sheets-Sheet 2
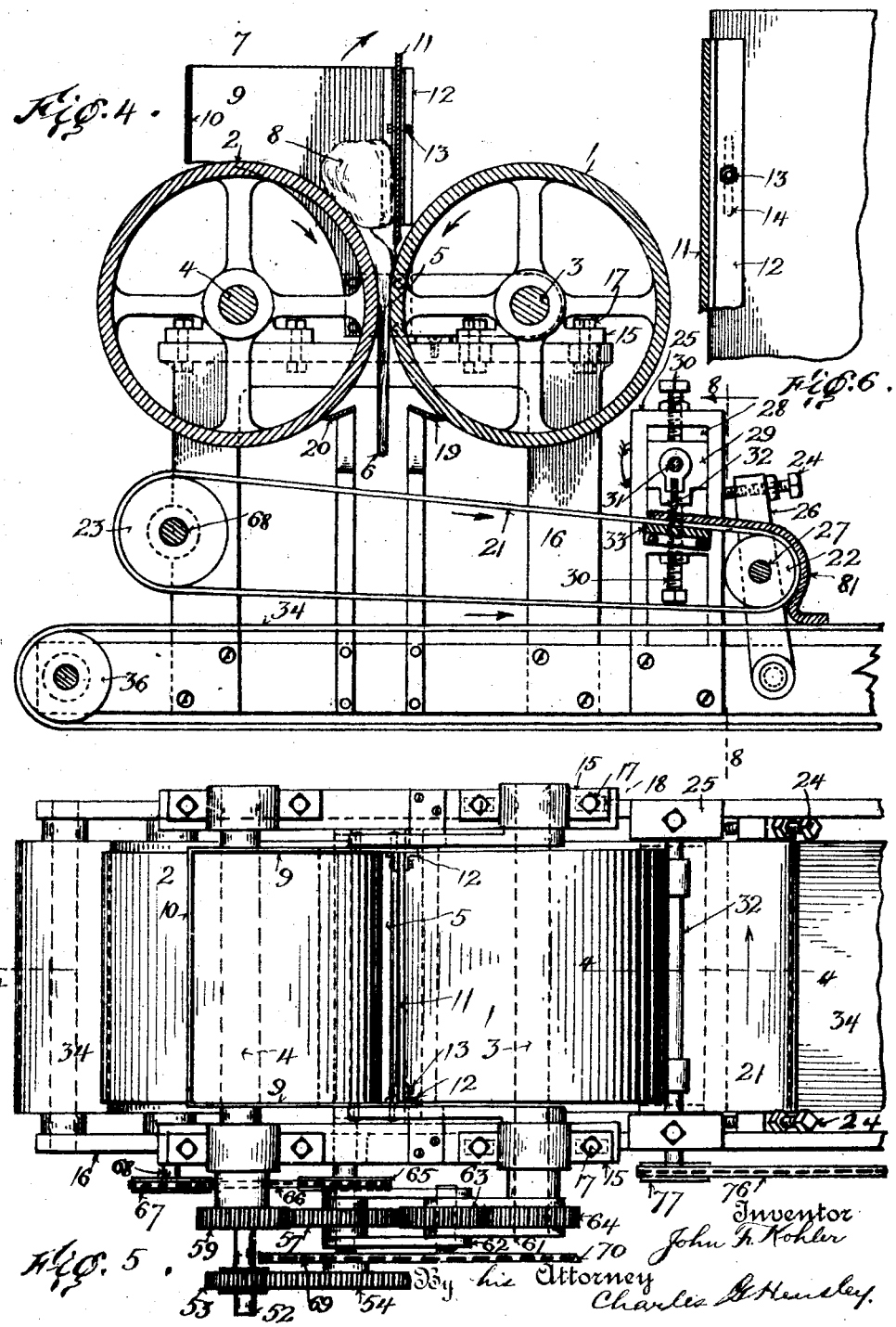

March 2, 1926. 1,575,213
J. F. KOHLER
MACHINE FOR ROLLING PIE CRUST DOUGH
Original Filed May 10, 1921 3 Sheets-Sheet 3
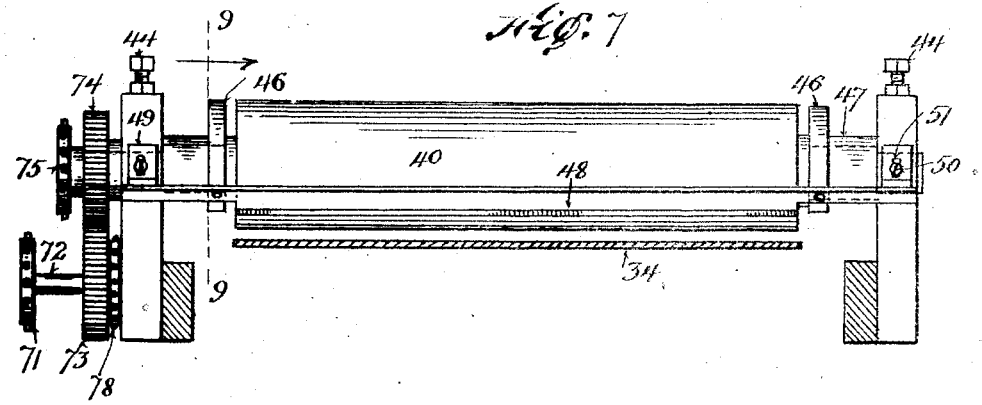
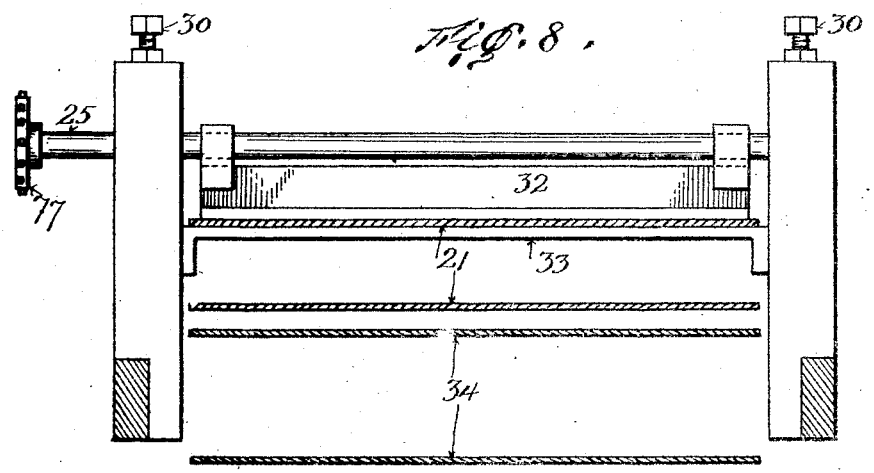
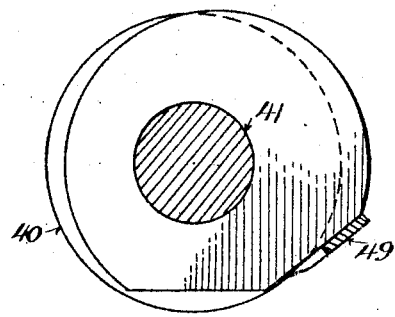

Patented Mar. 2, 1926.

1,575,213

UNITED STATES PATENT OFFICE.

JOHN F. KOHLER, OF WHITE PLAINS, NEW YORK, ASSIGNOR TO NEW YORK PIE BAKING COMPANY, OF NEW YORK, N. Y., A CORPORATION OF NEW YORK.

MACHINE FOR ROLLING PIE-CRUST DOUGH.

Application filed May 10, 1921, Serial No. 468,237. Renewed July 22, 1925.

*To all whom it may concern:*

Be it known that I, JOHN F. KOHLER, a citizen of the United States, and a resident of White Plains, county of Westchester, and State of New York, have invented certain new and useful Improvements in Machines for Rolling Pie-Crust Dough, of which the following is a specification.

My present invention relates to machines for rolling dough into sheets suitable for use in making pies. In making certain articles of food it is very desirable that the dough be worked or kneaded but in the preparation of dough for pies and such like the pastry is made very tough after baking if in the preparation the dough has been handled or kneaded to any great extent. Therefore, in preparing the dough in sheets for the top and bottom crusts of pies, and for other pastry, the less pressing, working or kneading done to the dough either by hand, or by a machine, the more crisp and flaky the pie crust will be when baked. One reason why pie dough has to a large extent been prepared by hand labor is because of the absence of a machine which would prepare the dough with very slight pressure and kneading. The principal object of my invention is to provide a machine for rolling the dough into sheets with such slight pressure and kneading that the crust made from such dough will be as brittle and flaky as if the dough were prepared entirely by hand.

Another object is to roll the dough into sheets of uniform thickness and to provide for regulation of the machine in order to roll sheets of any desired thickness.

Another object is to roll the dough out in a continuous sheet or strip and to divide it into individual sheets of substantially uniform size suitable for individual pies. Other advantages will be apparent in the following detailed description.

In the drawing forming part of this application,

Figure 1 is a side elevation of a machine embodying my invention,

Figure 2 is an enlarged plan view of parts of the conveying belts and the final roller, Figure 3 is a sectional view taken on the line 3—3 of Figure 2, Figure 4 is a sectional view taken on the line 4—4 of Figure 5, and it shows the primary rollers, hopper, and the transporting belts, on a large scale, Figure 5 is a plan view of the same parts, Figure 6 is a detail view of the adjustable plate in the hopper, Figure 7 is a sectional view taken on the line 7—7 of Figure 1, Figure 8 is a sectional view taken on the line 8—8 of Figure 4, and Figure 9 is a sectional view taken on the line 9—9 of Figure 7.

The machine comprises primarily a hopper for a supply of dough, rollers for feeding out the dough and for rolling it without undue squeezing and working, conveying belts, a cut off device and a final roller.

The primary rollers 1, 2 are mounted on parallel shafts 3 and 4 and these rollers are so disposed that the adjacent portions of their surfaces are spaced apart at 5 to provide a space through which the initially formed sheet or strip of dough 6 passes and the distance between the rollers 1, 2 or the width of the space 5 (which is adjustable) determines the thickness of the original strip of dough. Principally over the roller 2 there is mounted a hopper 7 which receives a quantity or supply of dough 8 ready to be rolled into sheets to form the top or bottom or both top and bottom layers of pies. This hopper 7 comprises side walls 9 which partly enclose the sides of the rollers 1, 2 at their upper portions; the end wall 10 and the adjustable end wall 11, which latter is positioned near the space 5. This wall or plate 11 is adjustable in position and for this purpose the flanges 12 of the plate are secured by bolts 13 which pass through elongated slots 14 in the flanges 12 and this permits the plate 11 to be adjusted in its vertical position in relation to the outlet opening 5 between the rollers 1, 2.

The rollers 1, 2 are relatively adjustable to regulate the space 5 and for this purpose I prefer to make the roller 1 adjustable toward and from the roller 2. The shaft 3 of the roller 1 is for this purpose mounted in bearing blocks 15 which are secured to the frame 16 of the machine by bolts 17 passing through elongated slots 18 in the bearing blocks. By loosening the bolts 17 the blocks 15, together with the shaft 3 and its roller 1 may be adjusted to move the roller toward and from the roller 2 to regulate the space 5 through which the dough is initially fed.

Near the lower portions of the surfaces of the rollers 1, 2 I have provided scrapers 19, 20 which lie near or against the peripheries of these rollers and they serve to prevent the strip of dough from following around with the rollers beyond the point of its intended delivery to the first conveyer belt.

Below the rollers 1, 2 and the delivery space 5 there is an endless belt or conveyor 21 traveling around the pulleys 22, 23 and the upper run of this belt is preferably inclined downwardly in the direction of travel of the strip of dough as shown in Figure 4. The belt 21 is adapted to be tightened whenever it is unduly slack, by means of adjusting screws 24 pressing against the brackets 25, these screws being mounted in a pair of levers 26 pivoted to the frame 16 and in which the shaft 27 of the pulley 22 is mounted.

To the right of the vertical plane of the delivery space 5 in Figure 4 I have mounted the cutting or severing device which operates to sever the strip of dough into individual sheets. There is a pair of brackets 25 attached to the opposite sides of the frame of the machine and these brackets have vertical sockets 28 in which the bearing blocks 29 are adjustable vertically. Adjusting screws 30 engaging above and below each bearing block 29 are adapted to adjust the vertical positions of these bearing blocks. In these bearing blocks is mounted the shaft 31 which carries a revolving blade 32, the edge of which approaches close to or touches the upper surface of the top run of the belt 21, the blade being revolved so that its edge will periodically come into contact with the belt at definite intervals. The edge of this blade 32 travels at a different speed, preferably faster, than the surface of the belt 21 and the strip of dough which is conveyed upon it, in order that the knife will cut or press through the strip of dough and then push along one of the severed ends so that the ends of the strip of dough where cut will not subsequently adhere together after the knife has moved away. I have shown a platen or plate 33 for supporting the belt 21 at the point where the knife 32 presses against it, to prevent the belt from sagging away from the knife.

The upper run of the belt 21 travels at a speed at which the strip of dough 6 is delivered through the space 5.

Below the belt 21 there is a second belt or conveyor here shown as an endless belt 34 traveling around pulleys 35 and 36 at opposite ends of the machine. The top run of this belt, which is shown horizontally disposed, travels just under the belt 21, and for a purpose which will be hereinafter explained, the surface speed of the belt 34 is greater than the surface speed of the belt 21 and I have found that the relationship of two to one in these surface speeds is very advantageous. Any undue slack in the belt 34 may be taken up by regulating the screws 37 to move the blocks 38 in which the shaft 39 of the pulley 36 is journaled at one end of the machine.

The belt 34 receives the dough from the belt 21 and delivers it to the operators at the delivery end of the machine in individual sheets of the required size to be applied to the pies or to the pie plate, if the product is to be used for making pies. The dough receives its final rolling operation while traveling on this belt 34. For this purpose there is a rolling out roller 40 positioned across and above the top run of the belt 34 and its shaft 41 is journaled in bearing blocks 42 which are adjustable vertically in the brackets 43 on the frame, by means of adjusting screws 44, the blocks 42 being pressed upwardly against these screws by compression springs 45 pressing against the under sides of the blocks. Eccentric plates 46 mounted on the stationary sleeves 47 carry a stripper or scraping knife 48 the edge of which lies close to or against the periphery of the roller 40 to prevent the dough from traveling around with the roller 40 by stripping it therefrom if it should adhere thereto. This compels the sheet of dough to travel with the belt 34. The disks 46 are adjustable to regulate the knife edge 48 in relation to the periphery of the roller 40 and for this purpose the plates 49 which engage the extended ends of the blade 48 may be adjusted by means of the bolts 50 passing through the elongated apertures 51 in the plates. By raising and lowering the plates 49 the knife may be adjusted to press lightly against the roller 40.

The driving mechanism for the several parts of the machine consists of the following: The shaft 52 driven by any suitable source of power, has a pinion 53 meshing with and operating a large gear 54 mounted on the shaft 55. There is a gear 56 on this latter shaft which meshes with and drives the intermediate gear 57 mounted on a shaft 58. This intermediate gear, in turn, operates the gear 59 on the shaft 4 of one of the primary rollers.

There is a shaft 60 carried at the pivotal connection of the toggle arms 61, 62 which pivot respectively from the shaft 3 and the shaft 58. On the shaft 60 there is a second intermediate gear 63 which meshes with and is operated by the intermediate gear 57; and it in turn operates a gear 64 on the shaft 3 of the roller 1. As the roller 1 is adjusted toward or from the roller 2 to regulate the space 5, the arms 61, 62 pivot at the shaft 60 and the intermediate gear 63 is altered in position relatively to the stationary intermediate gear 57 so that the gear 63 always remains in mesh with the intermediate gear 57 and the gear 64 in any position of the roller 1.

There is a sprocket 65 on the main shaft 55 and a chain 66 traveling over this sprocket operates the sprocket 67 on the shaft 68 and through this mechanism the upper or slow moving belt is operated.

There is a large sprocket 69 on the main shaft 55 and over this travels the endless chain 70 which latter operates the smaller sprocket 71 on the shaft 72. A gear 73 on this latter shaft, operates a gear 74 on the shaft 41 of the final dough roller. On the shaft 41 there is a sprocket 75 over which the endless chain 76 engages and this chain extends rearwardly and operates the sprocket 77 on the shaft 31 of the cutting off device; and through this mechanism the cutting off knife is operated at a faster speed than the slow moving belt 21.

On the shaft 72 there is another sprocket 78, and the endless chain 79 engaging over this sprocket operates the sprocket 80 on the shaft 39; and this mechanism operates the lower or fast moving belt 34. The difference in size of the sprockets 69 and 56 on the main shaft 55 causes the difference in speed between the slow moving belt 34 on the one hand and the faster moving belt 21, the final roller 40 and the cutting off device 32 on the other hand.

*Operation.*—A supply of dough is placed in the hopper 7 so that it rests principally on the roller 2 which latter may contact with the dough on a quarter of its periphery or slightly more, in order to provide sufficient frictional contact to propel the dough through the outlet space 5. The dough has only a slight engagement with the roller 1 because the wall 11 limits the contact with its surface to a small area from the bottom end of the wall 11 to the outlet space 5. As the rollers 1, 2 revolve, the latter causes the body of dough to revolve in the form of a roll and part of this roll is gradually carried by the roller 2 toward the opening 5, similar to the cutting of a veneer from a revolving log. Or the action may be compared with the unrolling of a strip of paper from a roll. The adhesion of the dough on the roller 1 is only sufficient to take it away from the bottom of the wall 11. As a result of this arrangement the dough is taken off the outside of the roll at about the same rate that it is fed through the space 5 at the bight of the feed rollers 1, 2. This action prevents any excessive squeezing of the dough as it is fed through the space 5 and it avoids undue working or pressing of the dough in the hopper. As a result, the dough is passed through the space 5 without substantial change, which is an important factor in the handling of dough which is to be used for pie crust or pastry. The dough passing through the space 5 will move down to the top surface of the top run of the slow moving belt 21 in a strip of uniform thickness. I prefer to arrange the rollers 1, 2 so that this strip of dough will be about twice the thickness of the final sheets, although the proportions may be varied if desired. Whenever the thickness of the final sheets is to be altered, then the roller 1 is moved to a position closer to or further from the roller 2 accordingly as the strip 6 is to be formed thinner or thicker. If the roller 1 is moved nearer to the roller 2 then the wall or plate 11 should be adjusted to a slightly lower position to decrease the area of contact of the dough in the hopper with the periphery of the roller 1; and, conversely, if the roller 1 is moved further from the roller 2 then the plate or wall 11 should be slightly raised.

The strip of dough emerging through the space 5 between the rollers 1, 2 moves down upon the upper run of the belt 21 and it rests thereon and is carried along by this belt, passing under the cutter 32. The revolving blade 32 periodically cuts through the strip of dough, by pressing into it while on the belt 21 and as the edge of the blade travels faster than the surface of this belt, and also the strip 6, the blade pushes along one severed end of the strip so that the severed ends are separated to prevent their coming together again and adhering to one another. The sheets 81 thus severed are shorter in the direction of the length of the belt 21 than the finished sheets. The sheet after passing the severing device passes down onto the top run of the belt 34 which is traveling at a faster rate than the belt 21. It travels along with the belt 34 until it reaches the roller 40 and while passing under the roller 40 the sheet is rolled out thinner. As the distance between the roller 40 and the belt 34 is less than the thickness of the sheet of dough when the latter reaches this roller the sheet in passing between the roller 40 and the belt 34 is rolled out much thinner preferably to about one half its original thickness; and the final thickness corresponds with the thickness desired when the sheet is to be applied in the making of the pie. In this final rolling operation, the sheet is not only decreased in thickness but it is rolled out so that its length is approximately twice what it was before this second rolling operation and it is increased in width as well. By regulating the thickness of the original strip formed by the rollers 1, 2 and by regulating the distance between the roller 40 and the belt 34 the size and thickness of the final sheets will be substantiallly uniform and conform to the dimensions required. The sheets after leaving the roller 40 are carried along on the belt 34 and they are taken off by the pie makers. The principal object in operating the belt 34 faster than the belt 21 is to allow the roller 40 to lengthen the sheets as well as decrease their thickness, without crowding one sheet back upon the other as they would do if the belt 21 delivered the sheets as fast as they are conveyed on the belt 34.

As the dough is not crushed or worked to any considerable degree in the machine it is just as well adapted for pie making as if carefully prepared by hand labor and this is important in pie making because otherwise the dough when baked would be tough.

Having described my invention, what I claim is:

1. In a machine of the class described, the combination of a pair of cooperating rollers spaced apart and adapted to roll a body of dough between them into sheet or strip form, and a hopper for holding a supply of dough to be taken by said rollers, said hopper being so disposed in relation to said rollers that the dough contained therein will have a relatively large area of contact with one of said rollers, and a wall in said hopper adjustable relatively to one of said rollers and arranged adjacent to the bight of said rollers and adapted to limit the contact of said body of dough with the other of said rollers to a relatively smaller uniform area than the area of contact with said first roller.

2. In a machine of the class described, the combination of a pair of cooperating rollers spaced apart and adapted to roll a body of dough between them into sheet or strip form, a hopper for holding a supply of dough to be taken by said rollers, said hopper being arranged over said rollers whereby the dough will have a relatively large area of contact with one of said rollers and a vertically arranged adjustable wall adjacent the bight of said rollers and adapted to limit the contact of the dough with the other of said rollers to a smaller area than the area of contact with said first mentioned roller.

3. In a machine of the class described, the combination of a pair of cooperating parallel rollers spaced apart and adapted to roll a body of dough between them into sheet or strip form, means for adjusting a roller to alter the distance between the pair of rollers, and a hopper for holding a supply of dough to be taken by said rollers, said hopper being so disposed in relation to said rollers that the dough contained therein will have a relatively large area of contact with one of said rollers and a relatively smaller area of contact with the other of said rollers, said hopper having a vertical wall disposed over one of said rollers.

4. In a machine of the class described, the combination of means for rolling a body of dough into strip form of substantially uniform thickness, a conveyor for receiving the strip of dough therefrom, means for operating to sever said strip into individual sheets while moving with said conveyor, said severing means operating at a different speed to said conveyor to separate the severed edges of the dough, a second conveyor moving faster than said first conveyor and receiving the dough therefrom, and a roller for re-rolling said dough into a thinner body of substantially uniform thickness and operating on the dough while it is moving with said second conveyor.

Signed at the city, county and State of New York, this 6th day of May, 1921.

JOHN F. KOHLER.